United States Patent [19]
Otto

[11] 3,820,863
[45] June 28, 1974

[54] UNITARY END FRAME AND BEARING SUPPORT MEMBER FOR A DYNAMOELECTRIC MACHINE

[75] Inventor: Charles W. Otto, Dekalb, Ill.

[73] Assignee: General Electric Company, Fort Wayne, Ind.

[22] Filed: Apr. 21, 1972

[21] Appl. No.: 246,286

[52] U.S. Cl. .............................................. 308/132
[51] Int. Cl. .......................................... F16c 33/66
[58] Field of Search..................... 308/121, 127, 132

[56] References Cited
UNITED STATES PATENTS

| | | | |
|---|---|---|---|
| 258,184 | 5/1882 | Williams | 308/132 |
| 1,416,884 | 5/1922 | Schmidt | 308/132 |
| 1,955,604 | 4/1934 | Pelts et al. | 308/132 |
| 2,503,021 | 4/1950 | Bennett | 308/132 |
| 3,235,317 | 2/1966 | Cunningham | 308/132 |

Primary Examiner—Charles J. Myhre
Assistant Examiner—Frank Susko

[57] ABSTRACT

A unitary support member is disclosed for a dynamoelectric machine comprising an end frame and a bearing surface having a preselected configuration of definitive length. The bearing surface has a longitudinal slot therein extending substantially the definite length whereby a lubricant impregnable wick may be mounted within the slot from which wick lubricant may be supplied directly throughout the definitive length to the bearing surface in lubricating a shaft rotatably journalled through the bearing.

23 Claims, 4 Drawing Figures

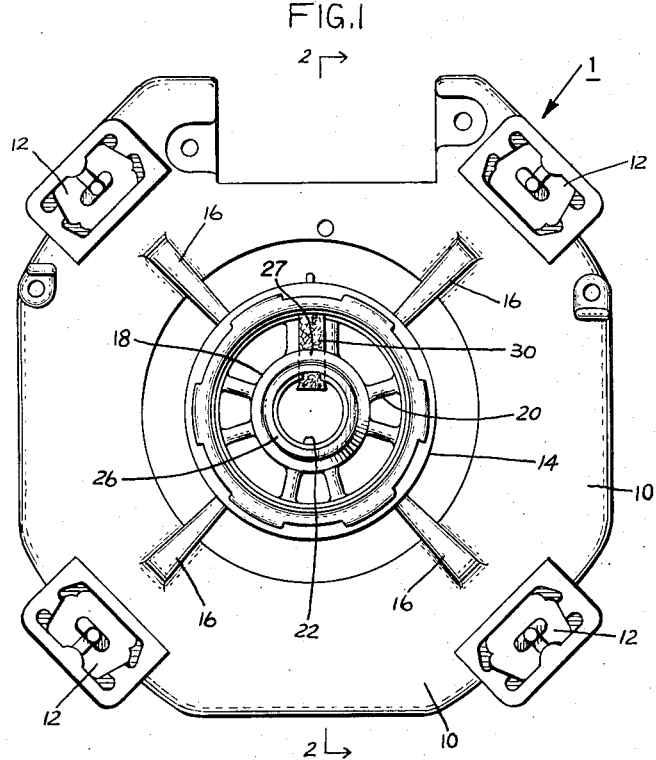
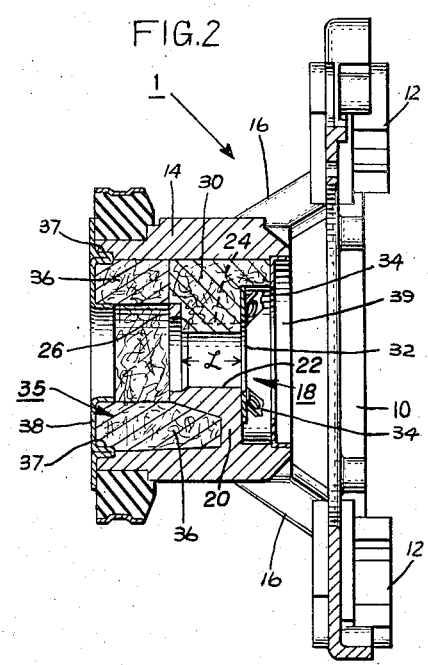
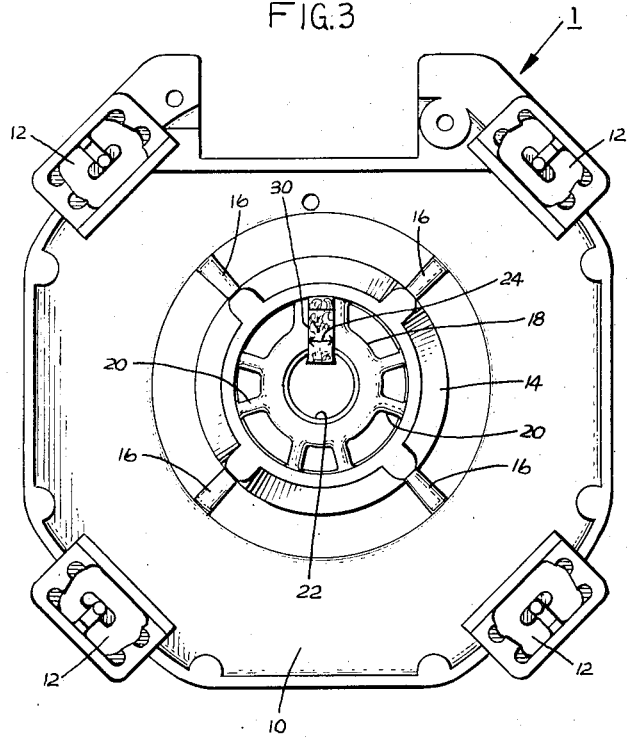
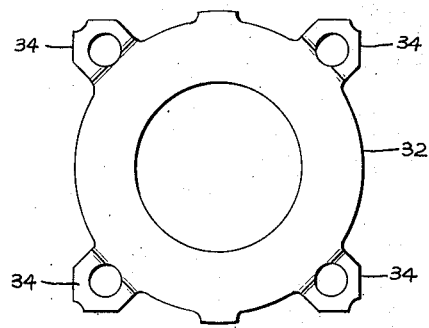

UNITARY END FRAME AND BEARING SUPPORT MEMBER FOR A DYNAMOELECTRIC MACHINE

BACKGROUND OF THE INVENTION

This invention relates generally to dynamoelectric machines and more particularly to end frame and bearing support members of such machines.

Most dynamoelectric machines, such as electric motors and generators, comprise a stator core and energizing windings wound thereon having an annular grouping of winding end turns extending from each face of the core coaxially the core bore. A rotor is rotatably mounted within the core by journalling the rotor shaft through two bearings. These bearings are carried by two end shields, respectively, mounted to the stator core with the annular groupings of winding end turns disposed therebetween.

Where such dynamoelectric machine end shields and bearings have been manufactured separately, the bearing has usually been of the sleeve type which is snugly mounted within a hub section of the end shield. To provide entry of lubricating fluids onto the surface of the bearing through which the rotor shaft is journalled, slots have been provided in such sleeve-type bearings. U.S. Pat. No. 2,469,846 is representative of such a configuration. In other cases, only a portion of the sleeve is apertured and into which aperture a wick is housed to draw lubricant from an adjacent reservoir to the journalled surface of the bearing. U.S. Pat. Nos. 2,007,021, 2,516,021 and 2,761,747 are representative samples of such art. To facilitate the flow of lubricant longitudinally over the bearing surface, the entire length of some sleeve-type bearings are slotted and into which slot a wick is housed from which lubricant may be directly drawn over the entire length of the bearing. U.S. Pat. No. 2,980,471 describes one such configuration.

Heretofore, substantial effort has been expended in attempting to make unitary dynamoelectric machine end shields and bearings in order to reduce the cost of manufacturing the two components separately and of assembling them together. U.S. Pat. No. 3,264,045 describes evolution towards such a structure wherein a bearing and lubricant reservoir for the bearing are made unitary. U.S. Pat. No. 3,499,504 furthers such evolution by disclosing a bearing manufactured as an integral portion of the hub area of an aluminum end shield.

Though bearings and end shields have been made unitary, such has been accomplished at the sacrifice of the highly desirable feature heretofore found only in the sleeve-type bearings, namely the presence of a longitudinal slot extending the entire length of the bearing in which slot a wick is housed as described in the aforementioned U.S. Pat. No. 2,980,471. Since sleeve-type bearings are snugly encompassed by peripheral supports, such as end shield hub sections, it has been possible to provide a longitudinal slot extending the entire length of the bearing while maintaining radial rigidity. Such, however, has yet to be accomplished with integral bearings, for with a slot extending the entire length of such a bearing, radial rigidity would obviously be greatly diminished. Furthermore, a slot-shaped wick housed within such a slot would tend to move out of position thereby impairing proper flow of lubrication therefrom to the bearing surface. If these obstacles could be overcome and a unitary bearing having a longitudinal slot extending its full length come into being, a most significant advance in the state of the art would be achieved.

Accordingly, it is a general object of the present invention to provide an improved unitary end frame and bearing support member for a dynamoelectric machine which overcomes the disadvantageous features of the prior art as mentioned above.

More specifically, it is an object of the invention to provide a unitary end frame and bearing support for a dynamoelectric machine in which lubricant may be supplied directly throughout the length of the bearing surface from a lubricant impregnable wick in lubricating a shaft rotatably journalled through the bearing.

Another object of the invention is to provide a unitary end frame and bearing support member for a dynamoelectric machine in which lubricant may be supplied directly throughout the length of the bearing surface from a lubricant impregnable wick, and which support member includes means inhibiting movement of the wick while simultaneously enhancing radial rigidity of the bearing.

Yet another object of the invention is to provide a unitary end frame and bearing support member of the type just described which may be cast from a unitary die core without need for loose or mobile die components.

SUMMARY OF THE INVENTION

In one form of the present invention a unitary support member is provided for a dynamoelectric machine comprising an end frame and a bearing surface having a pre-selected configuration of definitive length. The bearing surface has a longitudinal slot therein extending substantially the definitive length whereby a lubricant impregnable wick may be mounted within the slot from which wick lubricant may be supplied directly throughout the definitive length to the bearing surface in lubricating a shaft rotatably journalled through the bearing.

BRIEF DESCRIPTION OF THE DRAWING

FIG. 1 is a plan view of a unitary end frame and bearing support member of a fractional horsepower motor which member embodies principles of the present invention;

FIG. 2 is a sectional view of FIG. 1 taken along line 2—2.

FIG. 3 is bottom view of the opposite side of the unitary end frame and bearing support member shown in FIG. 1; and FIG. 4 is plan view of the thrust plate appendage shown in FIG. 2.

DESCRIPTION OF THE PREFERRED EMBODIMENTS

Referring now in detail to the drawings there is shown in FIGS. 1–3 an end frame or support member indicated generally at 1, for a dynamoelectric machine having a rotatable shaft, (not shown) and the end frame; preferably is made of die cast aluminum or the like, as is well known in the art. The member 1 comprises an end shield section 10 having integrally four formed sockets 12 into which four beams extending from a stationary member of the dynamoelectric machine may be rigidly secured (not shown). The support member 1 further includes a cylindrical hub 14 joined to the end shield section 10 by a plurality of conically disposed or generally radially extending spoke sections 16. A generally cylindrical bearing 18 is coaxially disposed within hub 14 by means of a plurality of support sections 20. The bearing 18 has a cylindric bearing surface 22 integrally formed therewith and of definitive length L in which a shaft of the dynamoelectric machine, not shown, may be rotatably journalled. A slot or opening 24 extends longitudinally through bearing surface 22 generally along the entire length thereof, i.e., for definitive length L. Preferably, the slot 24 is located on that portion of the bearing 18 which assumes the highest elevational position thereof once the motor is completely assembled and mounted for operation. Such elevation renders the slot 24 remote from the dynamic pressure point established by the shaft therewithin during shaft rotation and utilizes the minor gravitational forces present to advantage in drawing lubricant over the bearing surface 22. A portion of one end of slot 24 is closed by a generally annular bearing stiffening bridge or rib member 26 having at least a generally arcuate portion 27 disposed generally coaxially of bearing surface 22, which bridge has an inside diameter slightly greater than that of the bearing surface whereby contact between the annular bridge and motor shaft is avoided. Bridge 26 is disposed radially outwardly of cylindric surface 22 relative to the shaft or between hub 14 and the cylindric surface. A slight chamfer exists at the intersection of the slot with the bearing surface.

To support member 1 are mounted several appendages for effecting long term bearing lubrication. As seen in FIGS. 1-3, means for feeding lubricant to the shaft, such as an oil based lubricant impregnable and permeable wick 30, is snugly fitted into slot 24, which wick generally extends definitive length L. Prior to journalling of the shaft through the bearing 18 a small portion of the wick 30 projects out of the slot 24 into the bearing; however, once the shaft is rotatably journalled therewithin, the projecting portion of the wick is compressed back into the slot thereby insuring continued intimate contact with the shaft during shaft rotation.

With particular reference now to FIG. 2, a portion of wick 30 is seen to extend over a portion of the outer periphery of annular bridge 26 adjacent one end of the bearing while at the other end of the bearing another portion of the wick extends over a portion of the outer periphery an annular thrust plate 32 thereby to maintain the wick in its assembled position against displacement through slot 24 toward cylindric surface 22. Another portion of wick 30 abuts hub 14 for maintaining wick 30 against displacement from slot 24 away from cylindric surface 22. The thrust plate 32, the details of which are shown in FIG. 4 and which preferably is made of steel or the like, is press fitted within hub 14 by means of integral lugs 34. The bridge 26 and thrust plate 32 thusly situated with wick 30 sandwiched therebetween prevent both longitudinal and radial movement of the wick with respect to the bearing 18. The bridge 26, as well as radial supports 20, also provide radial rigidity to the bearing 18 necessitated by the presence of longitudinal slot 24.

As seen in FIG. 2, a lubricant reservoir 35 is provided in hub 14 and generally filled with lubricant storage means, such as lubricant impregnated packing 36 of wool material or other material well known in the art, positioned within hub 14 about the bearing in intimate contact with wick 30. One end of the packing 30 is positioned flush against radial spokes 20 while the other end is positioned and supported by end cap 38 press fitted into the end of hub section 14. Finally, an annular oil well cover 39 is tightly fitted into the other end of the hub section against a projecting portion of wick 30.

It will be noted that the end frame support member 1 just described in detail is indeed unitary. It thus may be manufactured rapidly, inexpensively, and due to its unique configuration, from a unitary die core. This latter feature is attributable in part to the fact that bridge 26 is located at one end only of the bearing 18 whereby the unitary structure once formed, may be axially removed from its die core. In addition, the described appendages may be assembled quite easily as by axially inserting the performed wick 30 and reservoir packing 36 within the hub 14 and then press fitting the end cap 38 and thrust plate 32. The resulting self lubricating bearing has been found to perform well over extended periods of time under varying load and environmental conditions.

It should be understood that the embodiment just described in detail is presented to illustrate principles of the invention in one specific form. Many modifications may, of course, be made to this particular embodiment without departure from the spirit and scope of the invention as set forth in the following claims.

What I claim as new and desire to secure by letters Patent of the United States is:

1. An end frame for a dynamoelectric machine having a rotatable shaft comprising a generally cylindric bearing surface having a definitive length and diameter and formed integrally with the end frame for bearing engagement with the shaft, the cylindric surface having a slot therein generally extending the definitive length of the cylindric surface, a lubricant impregnable wick mounted within the slot adjacent the cylindric surface for supplying lubricant to the shaft therein, and an annular stiffening bridge extending over one end of the slot generally coaxially of the cylindric surface and having an inner diameter greater than the diameter of the cylindric surface.

2. An end frame in accordance with claim 1 wherein the wick substantially fills the slot.

3. An end frame in accordance with claim 1 wherein a portion of the wick extends over a portion of the periphery of the annular stiffening bridge.

4. An end frame in accordance with claim 1 further comprising a thrust plate closing at least a portion of one end of the slot, and wherein a portion of the wick extends over a portion of the peripheral edge of the thrust plate.

5. A support member for a dynamoelectric machine having a rotatable shaft comprising a generally cylindric surface integral with the support member for bearing engagement with the shaft, an opening intersecting the cylindric surface generally along the entire length thereof, means disposed within the opening for feeding lubricant to the shaft, and means for bridging the opening adjacent one end of the cylindric surface, the bridging means being spaced radially outwardly of the cylindric surface relative to the shaft.

6. A support member as set forth in claim 5, wherein the bridging means comprises at least an arcuate portion extending across the opening.

7. A support member as set forth in claim 5, wherein the bridging means comprises a generally annular stiffening rib member disposed generally coaxially of the cylindric surface and extending across the opening.

8. A support member as set forth in claim 5, further comprising a reservoir for lubricant storage in the member and communicating with the opening.

9. A support member as set forth in claim 8, wherein at least a portion of the lubricant feeding means extends into the reservoir, and means for storing lubricant disposed in the reservoir in lubricant transfer relation with the lubricant feeding means.

10. A support member as set forth in claim 9, wherein at least another portion of the lubricant feeding means extends through the opening adjacent the cylindric surface for lubricating engagement with the shaft.

11. A support member as set forth in claim 5, wherein the lubricant feeding means substantially fills the opening.

12. A support member as set forth in claim 5, further comprising means mounted on the member for closing at least a portion of one end of the opening.

13. A support member as set forth in claim 12, wherein a portion of the lubricant feeding means is disposed in positioning engagement with the closing means.

14. A support member as set forth in claim 5, wherein a portion of the lubricant feeding means is disposed in positioning engagement with the bridging means.

15. A support member as set forth in claim 13, wherein the lubricant feeding means is engaged with the bridging means and the closing means for maintaining the lubricant feeding means generally in a predetermined position within the opening.

16. An end frame for a dynamoelectric machine having a rotatable shaft comprising a hub on the end frame, a bearing disposed within the hub, means for spacing the bearing generally coaxially of the hub, a generally cylindric surface integrally formed within the bearing for bearing engagement with the shaft, an opening in the bearing intersecting the cylindric surface generally along its entire length, means on the bearing adjacent one end of the cylindric surface for bridging the opening, the bridging means being disposed between the hub and cylindric surface, and means extending through the opening adjacent the cylindric surface for feeding lubricant to the shaft.

17. An end frame as set forth in claim 16, wherein the bridging means comprises at least a generally arcuate rib extending across the opening.

18. An end frame as set forth in claim 16, wherein the bridging means comprises a generally annular rib integral with the bearing and disposed generally coaxially of the cylindric surface with a portion of the rib extending across the opening.

19. An end frame as set forth in claim 16, further comprising a pair of means engaged with the hub on opposite sides of the bearing and defining with the hub and bearing a lubricant reservoir communicating with the opening.

20. An end frame as set forth in claim 19, further comprising lubricant storage means disposed in the reservoir in lubricant transfer relation with the lubricant feeding means.

21. An end frame as set forth in claim 16, further comprising means engaged with the hub and the bearing adjacent the other end of the cylindric surface for closing at least a part of the opening.

22. An end frame as set forth in claim 21, wherein the lubricant feeding means includes a pair of means for respective engagement with the closing means and bridging means thereby to prevent displacement of the lubricant feeding means from the opening toward the cylindric surface.

23. An end frame as set forth in claim 22, wherein the lubricant feeding means further includes means for engagement with the hub thereby to prevent displacement of the lubricant feeding means from the opening away from the cylindric surface.

* * * * *

UNITED STATES PATENT OFFICE
CERTIFICATE OF CORRECTION

PATENT NO. : 3,820,863
DATED : June 28, 1974
INVENTOR(S) : Charles W. Otto

It is certified that error appears in the above-identified patent and that said Letters Patent are hereby corrected as shown below:

Column 2, line 9, after "art" insert --,--

Column 2, line 48, after "view" delete "of FIG. 1"

Column 2, line 49, after "2--2" insert --of FIG. 1;--

Column 2, line 62, after "shaft" delete ","

Column 2, line 62, after "(not shown)" insert --,--

Column 2, line 63, after "frame" delete --;--

Column 2, line 65, after "having" delete "integrally"

Column 2, line 65, after "four" insert --integrally--

Column 3, line 50, after "periphery" insert --of--

Column 4, line 3, change "30", second occurrence, to -- 36 --.

Signed and sealed this 15th day of April 1975.

(SEAL)
Attest:

RUTH C. MASON
Attesting Officer

C. MARSHALL DANN
Commissioner of Patents
and Trademarks

MAILING ADDRESS OF SENDER:

John M. Stoudt, Division Patent Counsel
Appliance Components Business Division
General Electric Company
1635 Broadway
Fort Wayne, Indiana 46804